United States Patent [19]

Stroup

[11] 3,814,566
[45] June 4, 1974

[54] APPARATUS FOR CONTINUOUSLY CONVERTING MESOPHASE PITCH INTO A HIGHLY ORIENTED STRUCTURE

[75] Inventor: Robert C. Stroup, Bay Village, Ohio

[73] Assignee: Union Carbide Corporation, New York, N.Y.

[22] Filed: Oct. 31, 1972

[21] Appl. No.: 302,571

[52] U.S. Cl. .................... 425/144, 264/29, 425/379
[51] Int. Cl. ......................... B29f 3/04, C04b 35/54
[58] Field of Search ........... 425/143, 144, 378, 379; 264/29, 108

[56] References Cited
UNITED STATES PATENTS

| | | | |
|---|---|---|---|
| 2,332,829 | 10/1943 | Parsons et al. | 264/108 |
| 2,702,408 | 2/1955 | Hartland | 425/379 X |
| 3,642,402 | 2/1972 | Hutchinson et al. | 425/144 |
| 3,666,847 | 5/1972 | Bailey | 425/379 X |

*Primary Examiner*—Robert D. Baldwin
*Attorney, Agent, or Firm*—John S. Piscitello

[57] ABSTRACT

An apparatus for continuously converting hydrocarbonaceous material, such as mesophase pitch, into an oriented structure, comprising an auger extruder coupled to a converging - straight - diverging forming die. The die has disposed around it a floating heating coil which is axially movable in response to the pressure sensed at the discharge exit of the extruder.

6 Claims, 1 Drawing Figure

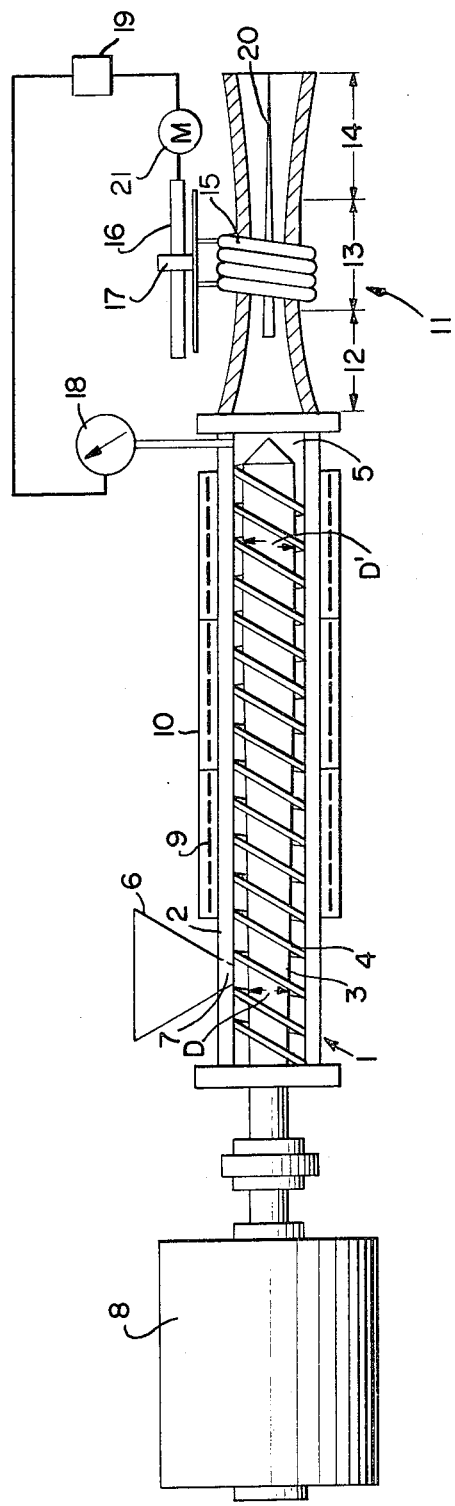

APPARATUS FOR CONTINUOUSLY CONVERTING MESOPHASE PITCH INTO A HIGHLY ORIENTED STRUCTURE

BACKGROUND OF THE INVENTION

1. Field of the Invention

The invention relates broadly to an apparatus comprising an auger extruder coupled to a three-section forming die and capable of simultaneously imparting shear to a hydrocarbonaceous material while heating it to a temperature sufficient to cause said material to become infusible so as to produce a highly aligned structured material on a continuous basis.

2. Description of Prior Art

Certain types of hydrocarbonaceous materials can be converted into a highly oriented structure characterized by the presence of carbon crystallites preferentially aligned in some desired fashion. To insure proper alignment of the carbon crystallites, it is necessary to thermally set the hydrocarbonaceous material while it is under shear. This could be accomplished by use of conventional die devices whereby the die could be used to place the material under shear while a heating device coupled to the die could be employed to thermally set the material. One major disadvantage of conventional devices is that they are limited to producing oriented structures on a non-continuous basis because once the material solidifies, it has to be removed thereby interrupting the process.

Another device that could be employed is the conventional auger extruder in which the extruder screw could be used to impart a shear while external and adjacent heating means can be used simultaneously to thermally set the pitch. However, once coking occurs, the solid material so produced has a tendency to clog up the extruder thus rendering the process intermittent and inefficient.

U. S. Pat. No. 3,666,847 disclosed an apparatus for extruding mixes of carbon particles and a carbonizable binder wherein said apparatus is defined by at least three sections comprising first a converging section, then a diverging section followed by a third and final section of substantially constant cross-section. Although this apparatus may be useful in some applications, it would not be useful for the production of highly structurally oriented coke since no heating means are shown and since the pitch would clog the extruder once it became thermally set.

As disclosed in U. S. Pat. Application Ser. No. 239,490, filed Mar. 30, 1972 and titled "High Modulus, High Strength Carbon Fibers Produced From Mesophase Pitch," assigned to a common assignee, carbonaceous pitches having a mesophase content of from about 40 percent by weight to about 90 percent by weight can be used to produce highly structurally oriented coke. However, to produce the preferred structure, it is necessary to thermally set or coke the pitch while it is under shear.

One of the primary purposes of this invention is to provide a device for continuously converting hydrocarbonaceous pitch, such as mesophase pitch, into a highly structurally oriented coke.

SUMMARY OF THE INVENTION

The invention broadly relates to an apparatus for continuously converting hydrocarbonaceous pitch, such as mesophase pitch, into a highly structurally oriented coke, said apparatus comprising an auger extruder having an input feed opening, an output discharge opening, and an extruder screw extending substantially the length of the extruder, said extruder screw comprising a continuous helical rib projecting from a reverse tapered shank such that the diameter of the shank at the input feed opening is smaller than the diameter of the shank at the output discharge opening; means for rotating said extruder screw; a first heating means substantially positioned around and axial along the extruder; a forming die coupled to the discharge opening of the extruder and possessing three sections defined by the walls of the die which comprises a converging first section, followed by a substantially constant cross-sectional second section and a final diverging third section; a second heating means positioned at least substantially around a portion of said second section and axially movable along at least the second section of the forming die; pressure detecting means positioned in and at the vicinity of the discharge opening; and transducer means coupled to the pressure detecting means and to the movable second heating means so that axial movement of said second heating means can be regulated by the pressure level sensed at the vicinity of the output discharge opening. In the operational mode, pitch is fed into the extruder where it is axially advanced by means of the rotating helical rib and at the same time compacted due to the reverse taper of the shaft containing the projected helical rib. While being compacted and thus being placed slightly under shear, the pitch is heated by suitable means and thereby it is converted into a somewhat structurally oriented form. At the output opening of the extruder, the pitch is discharged into a forming die having a first converging reduction section whereupon it is further compacted to a degree which converts it into a highly structurally oriented form. The pitch is then fed into a substantially constant cross-sectional second section of the die. Here, a hot spot type heating means, such as one or more coils, heats the advancing material to a temperature suitable for coking it thereby solidifying it in a highly structurally oriented form. The coke is then advanced into the diverging relief section of the die whereupon it can easily be removed. The relief section is provided to substantially minimize or eliminate plugging of the coke in the die. The hot spot type heating means is movable and preferably positioned as far back from the diverging relief section as possible so as to provide shear as long as possible. However, in practice, coking may occur earlier in the forming die and thus pressure will build up at the tip of the auger screw. To compensate for this, suitable conventional means, employed to monitor the pressure at the output opening of the extruder, are coupled to a conventional transducer which in turn is used to axially move the hot spot heating means via an appropriate motor or the like. Thus as the pressure buildup exceeds a pre-selected value, the pressure detection means will activate the motor means for the hot spot heater via the transducer and thereby move the hot spot heater axially forward to the relief section. This will provide relief further down stream of the forming die and thus delay the coking of the pitch. As the pressure at the output opening drops below the selected value, the hot spot heater moves axially backward in the direction of the reducing section to a position that will maintain substantially maximum shear on the moving pitch column so as to produce a high quality structurally oriented coke. Thus by having the pressure detecting means regulate the movement of the hot spot heating means, plugging of the apparatus is substantially minimized if not eliminated.

To further control the heating within the forming die, a mandrel may be axially positioned within the forming die and made of such a material that it can be inductionally heated by the hot spot heating means. This will provide a more uniform heating of the pitch within the die and thus better regulate the quality of the coke produced. The mandrel should be tapered with its larger diameter closest to the converging section of the die.

The sole DRAWING shows an extruder device made in accordance with this invention.

As shown in the drawing, an auger extruder 1 is composed of a cylindrical housing 2 having an internally disposed reverse tapered shank 3 with a continuous helical rib 4 projecting therefrom. The shank 3 is tapered such that the diameter D is smaller than the diameter D' at the vicinity of the output discharge opening 5. A funnel 6 is coupled to input feed opening 7 so that material deposited into funnel 6 will be fed into the space between shank 3 and the projected helical rib 4 directly below opening 7. Motor 8 is coupled to, and rotates shank 3 which thereby advances the material deposited through opening 7 along the length of the extruder due to the helical design of rib 4. As the material advances, it becomes slightly compacted due to the tapered shank 3 whereby the diameter of the shank 3 slightly increases from the input feed opening 7 to exit discharge opening 5. Resistive heating elements 9, encased in a conventional conductive material 10, are disposed around housing 2. The resistive heating elements 9, coupled to a convention power supply (not shown), are used to heat the material being axially transported along the length of the extruder by helical rib 4. Coupled to the output discharge opening 5 of the extruder is a three-section forming die 11 comprising a converging first section 12, followed by a substantially constant cross-sectional second section 13, and a final diverging third section 14. A heating coil 15 is placed around second section 13 and is designed to move axially along at least said section 13 by means of motor 21 which rotates screw type member 16 for moving nut type member 17 axially along die 11. Pressure sensing means 18 are coupled to the output discharge opening 5 for detecting the pressure thereat and is further coupled to a conventional transducer device 19 which converts the pressure sensing value to an energy form suitable to activate motor 21 whenever the pressure detected at output 5 falls outside a preselected pressure range. A tapered mandrel 20 is shown axially within die 11 and extending from section 12 to section 14. The mandrel 20 functions in conjunction with heating coil 15 to more uniformly heat the material being fed through die 11.

In the operational mode, material such as pitch is deposited into funnel 6 whereupon it is directed through input feed opening 7 onto shank 3. The projecting helical rib 4 advances the material axially through the extruder where it becomes slightly compacted due to the tapered shank 3 and simultaneously heated by heating elements 9. The heated compacted material is discharged at opening 5 into the three-section forming die 11. The first section 12 has a converging configuration so as to place the heated pitch under shear thereby orientating the crystals of the pitch into a preferred alignment. As the pitch is advanced into the second section 13, the coil 15 supplies a hot surface type of heating which solidifies the pitch into an infusible coke form thereby preserving the preferred structural alignment of the material. The structurally oriented coke is further advanced to the third section 14 of die 11 which has a diverging configuration. This final section 14 acts as a relief section enabling any volatile gases present to escape while simultaneously providing an enlarged opening for the coke to be discharged so as to minimize or eliminate plugging of the device. Since the material could coke within the initial portion of die 11, and thereby possibly cause plugging within die 11, heating coil 15 is designed to respond to the pressure detected at discharge opening 5, such detected pressure being an indication as to whether the pitch is coking too early or not. Heating coil 15 is preferably positioned away from the third section 14 of die 11 so as to maintain the pitch under shear for as long as possible. The pitch upon leaving the reduction or first section 12 is under shear and if solidified in this condition yield a highly structurally oriented coke. However, if the pitch becomes infusible too early, it may tend to clog the forming die 11 thereby necessitating a stoppage of the operation. By using the pressure sensing means 18 to detect pressure buildup at discharge opening 5, it is possible to predict when coking is occurring too early in die 11 and thus heating coil 15 can be moved forward via motor 21 which responds to the detected pressure level at opening 5 via transducer 19. This will provide relief since the coking will occur further downstream in the forming die 11. As the pressure at opening 5 decreases to within its preselected range, coil 15 will be repositioned to a location on die 11 where the pitch can be rendered infusible while under substantially maximum shear without plugging the die. Thus the movable or floating heating coil arrangement can be used to produce highly structurally oriented coke on a continous basis.

The use of mandrel 20 is optional and is dependent on the need for the pitch being processed to be heated uniformly. Likewise the taper of shank 3 can vary depending again on the pitch being processed. In some applications, it may be suitable not to have any taper on the shank at all since the reducing first section of the die imparts shear to the pitch prior to it being coked. The degree of convergence and divergence of the first and third sections of the forming die, respectively, will depend on the pitch being processed and any artisan can determine what degree would be optimum for a particular pitch.

When using mesophase pitch in the apparatus of this invention, granulated pitch having a mesophase content of from about 40 percent by weight to about 90 percent by weight can be fed into the extruder in a quantity so that it will advance at a rate of about 12 inches per minute. The resistive heating elements should heat the pitch to about 375°C. to melt the pitch and then it can be fed into the first section of the forming die where it will be subject to shear. The floating or movable heating coil should provide a hot surface of about 700°C. since the pitch requires a temperature of about 550°C. before it becomes infusible. Thus, as the pitch is advancing and while still under shear, it can be rendered infusible thereby solidifying the pitch in its preferred orientated form. The pressure detection means could be used to move the floating hot-spot type heating coil wherever the detected pressure registers a reading outside a selected range.

A pitch having a mesophase content of about 75 percent to about 80 percent by weight would be desirable using the apparatus of this invention since it would have fewer volatiles to dispel than pitch with a lower mesophase content and also a pitch with a higher mesophase content is capable of being formed into a structure having a higher degree of crystallite orientation than pitch with a lower mesophase content. Using the apparatus of this invention, mesophase pitch can be continuously converted into a highly aligned, low CTE coke admirably suited for various applications.

What is claimed is:

1. An apparatus for continuously converting hydrocarbonaceous pitch to highly structurally oriented coke comprising an auger extruder having an input feed opening, an output discharge opening, and an extruder screw extending substantially the length of the extruder, said extruder screw comprising a continuous helical rib projection from a shank; means for rotating said extruder screw; a first heating means substantially positioned around and axial along the extruder; a forming die coupled to the discharge opening of the extruder and possessing three sections defined by the walls of the die which comprises a converging first section, followed by a substantially constant cross-sectional second section and a final diverging third section; a second heating means positioned at least substantially around a portion of said second section and axially movable along at least the second section of the forming die; pressure detection means positioned in and at the vicinity of the discharge opening; and transducer means coupled to the pressure detecting means and to the movable second heating means so that the axial movement of said second heating means can be regulated by the pressure at the vicinity of the output discharge opening.

2. The apparatus of claim 1 wherein said second heating means comprises at least one induction coil.

3. The apparatus of claim 2 wherein a mandrel is positioned axially within a substantial portion of the forming die.

4. The apparatus of claim 1 wherein the shank of the extruder screw is reverse tapered such that the diameter of the shank at the input opening is smaller than the diameter of the shank at the output discharge opening.

5. The apparatus of claim 4 wherein said second heating means comprises at least one induction coil.

6. The apparatus of claim 5 wherein a mandrel is positioned axially within a substantial portion of the forming die.

* * * * *